(12) United States Patent
Lee

(10) Patent No.: US 6,608,962 B1
(45) Date of Patent: Aug. 19, 2003

(54) VIDEO CASSETTE RECORDER FOR AND METHOD OF PERFORMING HIGH-SPEED SEARCHING OF IMPORTANT INFORMATION, SUCH AS DESIRED TIME OR ALARM DATA

(75) Inventor: Seung Ho Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/332,133

(22) Filed: Jun. 14, 1999

(30) Foreign Application Priority Data

Jun. 23, 1998 (KR) .............................................. 98/23759

(51) Int. Cl.[7] ................................................. H04N 5/91
(52) U.S. Cl. ........................... 386/46; 386/68; 348/143; 348/159
(58) Field of Search ............................ 386/117, 46, 83, 386/68; 348/153, 143; H04N 5/91

(56) References Cited

U.S. PATENT DOCUMENTS

| 4,943,854 | A | * | 7/1990 | Shiota et al. ................ 348/159 |
| 5,519,549 | A | * | 5/1996 | Choi ............................ 360/71 |
| 5,615,017 | A | * | 3/1997 | Choi ............................ 386/117 |
| 5,671,009 | A | * | 9/1997 | Chun .......................... 348/153 |
| 6,091,884 | A | * | 7/2000 | Yuen et al. ................... 386/83 |

FOREIGN PATENT DOCUMENTS

JP          405135433 A   *   6/1993

* cited by examiner

*Primary Examiner*—Vincent Boccio
(74) *Attorney, Agent, or Firm*—Robert E. Bushnell, Esq.

(57) ABSTRACT

A VCR for performing a high-speed searching process includes: a video signal input for outputting a video signal sent from a plurality of photographing sections; an encoder for encoding channel information and time information relative to the video signal, and for adding the encoded information to the vertical blanking interval of the video signal; a recording/reproducing section for recording the signal composed by the encoder and reproducing the recorded video signal; a decoder for extracting the channel information and time information inserted by the encoder from video signals outputted from the reproducing section, and for decoding them; a controller for inverting a control pulse at predetermined time intervals when the video signal is recorded to record a point in time within the predetermined time intervals, for searching the recorded point in time within the predetermined time intervals in a high-speed mode based on the channel information and time information transmitted from the decoder when automatic searching is performed during reproduction, and for converting the mode of the VCR into a standard mode, starting from the searched point in time, when a desired point in time has been searched; and a video signal output for externally outputting the video signal sent from the reproducing section.

6 Claims, 4 Drawing Sheets

VIDEO CASSETTE RECORDER FOR AND METHOD OF PERFORMING HIGH-SPEED SEARCHING OF IMPORTANT INFORMATION, SUCH AS DESIRED TIME OR ALARM DATA

CLAIM OF PRIORITY

This application makes reference to, incorporates the same herein, and claims all benefits accruing 35 U.S.C.§119 from an application entitled VCR PERFORMING HIGH-SPEED SEARCHING OPERATION earlier filed in the Korean Industrial Property Office on Jun. 23 , 1998, and there duly assigned Serial No.98-23759 by that office.

BACKGROUND OF THE INVENTION

1. Field of the Invention

The present invention relates to a video cassette recorder (VCR) and related method by means of which a high-speed searching operation is performed and, more particularly, to a VCR and related method for carrying out a high-speed searching operation by automatically searching important information, such as desired time or alarm data, with a high speed when a user wants to search an image at a certain desired point in time among images recorded by a time-lapse VCR, thereby improving the user's monitoring efficiency.

2. Detailed Discussion of the Related Art

In general, a time-lapse VCR, which is an analog recording device for monitoring, repeatedly records and stops a plurality of video signals inputted from at least one video camera in a specific interval to reproduce images taken by the video camera later in a CCTV system. There are several methods of searching an image at a certain desired point in time among images recorded by the conventional time-lapse VCR. The first method is such that a user sequentially searches the image using a fast playback function while watching the images. The second method involves searching important data, such as alarm data, with a high speed using a VISS function, which is a method of inverting VCR control pulse to search specific image data. The third method involves encoding information such as channel information or time information, inserting it into the vertical blanking period where there is no video signal, and decoding it to search desired information when video signals are reproduced.

However, the above-mentioned conventional methods have the following problems. The first method cannot automatically search image data at a desired point in time. With the second method, the searching operation cannot be carried out based on time. In the third method, information should be searched while the video signals are slowly reproduced in the standard playback mode, and thus the searching operation cannot be performed in the high-speed playback mode of a VCR, thereby lengthening searching time.

SUMMARY OF THE INVENTION

An object of the present invention is to provide a VCR for performing a high-speed searching operation, wherein the VCR automatically searches important information, such as desired time or alarm data, with a high speed when a user wants to search an image at a certain desired point in time among images recorded by a time-lapse VCR, thereby improving the user's monitoring efficiency.

To accomplish the object of the present invention, there is provided a VCR which can perform a high-speed searching process, the VCR including: a video signal input for outputting a video signal sent from a plurality of photographing sections; an encoder for encoding channel information and time information about the video signal, and for adding the encoded information to the vertical blanking interval of the video signal; a recording/reproducing section for recording the signal composed by the encoder or reproducing the recorded video signal; a decoder for extracting the channel information and time information inserted by the encoder from video signals outputted from the reproducing section, and for decoding them; a controller for inverting a control pulse at predetermined time intervals when the video signal is recorded, so as to record a point in time within the predetermined time intervals, for searching the recorded point in time within the predetermined time intervals in a high-speed mode based on the channel information and time information transmitted from the decoder when automatic searching is performed during reproduction, and for converting the mode of the VCR into a standard mode, starting from the searched point in time, when a desired point in time has been searched, so as to allow the video signal to be reproduced in the standard mode, and for controlling the entire system; and signal output for externally outputting the video signal sent from the reproducing It is to be understood that both the foregoing general description and the following detailed description are exemplary and explanatory in nature, and are intended to provide further explanation of the invention as claimed.

BRIEF DESCRIPTION OF THE ATTACHED DRAWINGS

The accompanying drawings, which are included to provide a further understanding of the invention, and which are incorporated in and constitute a part of this specification, illustrate embodiments of the invention and, together with the description, serve to explain the principles of the invention: In the drawings.

DETAILED DESCRIPTION OF THE INVENTION

A VCR which can perform a searching operation with a high speed according to a preferred embodiment of the present invention is explained below with reference to the attached drawings.

Figure 1:
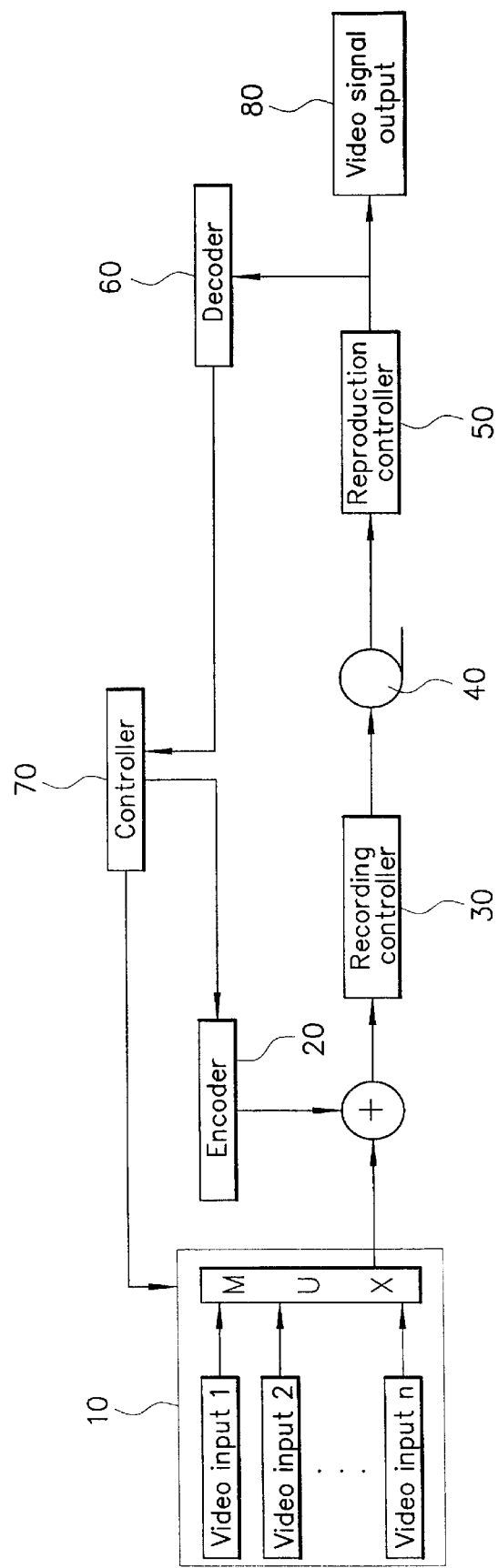
FIG. 1 is a block diagram of a VCR which performs a highs-speed searching operation in accordance with the present invention.
Figure 2:
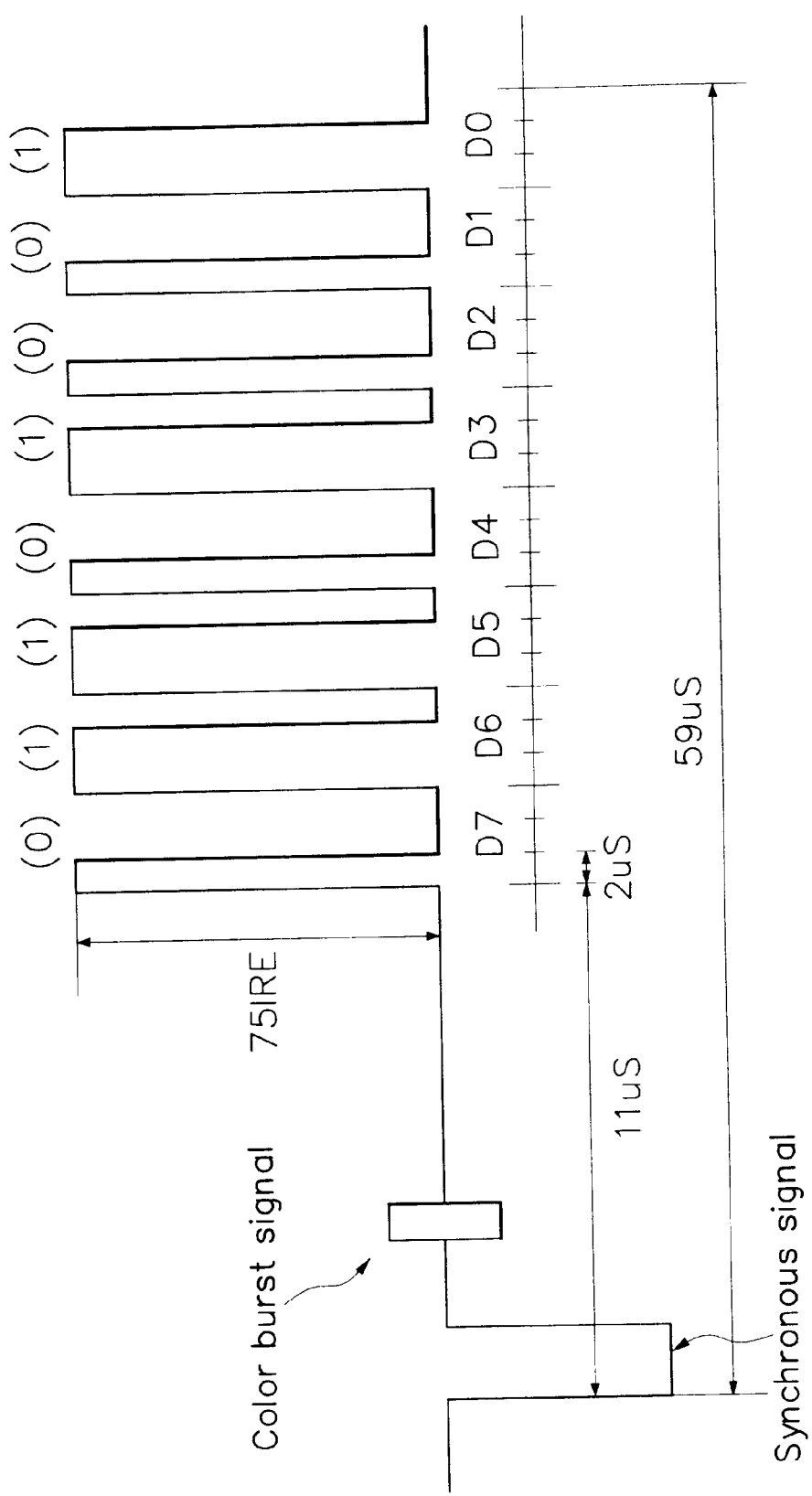
FIG. 2 is a diagram showing data included in one H-line applied to the present invention.
Figure 3:
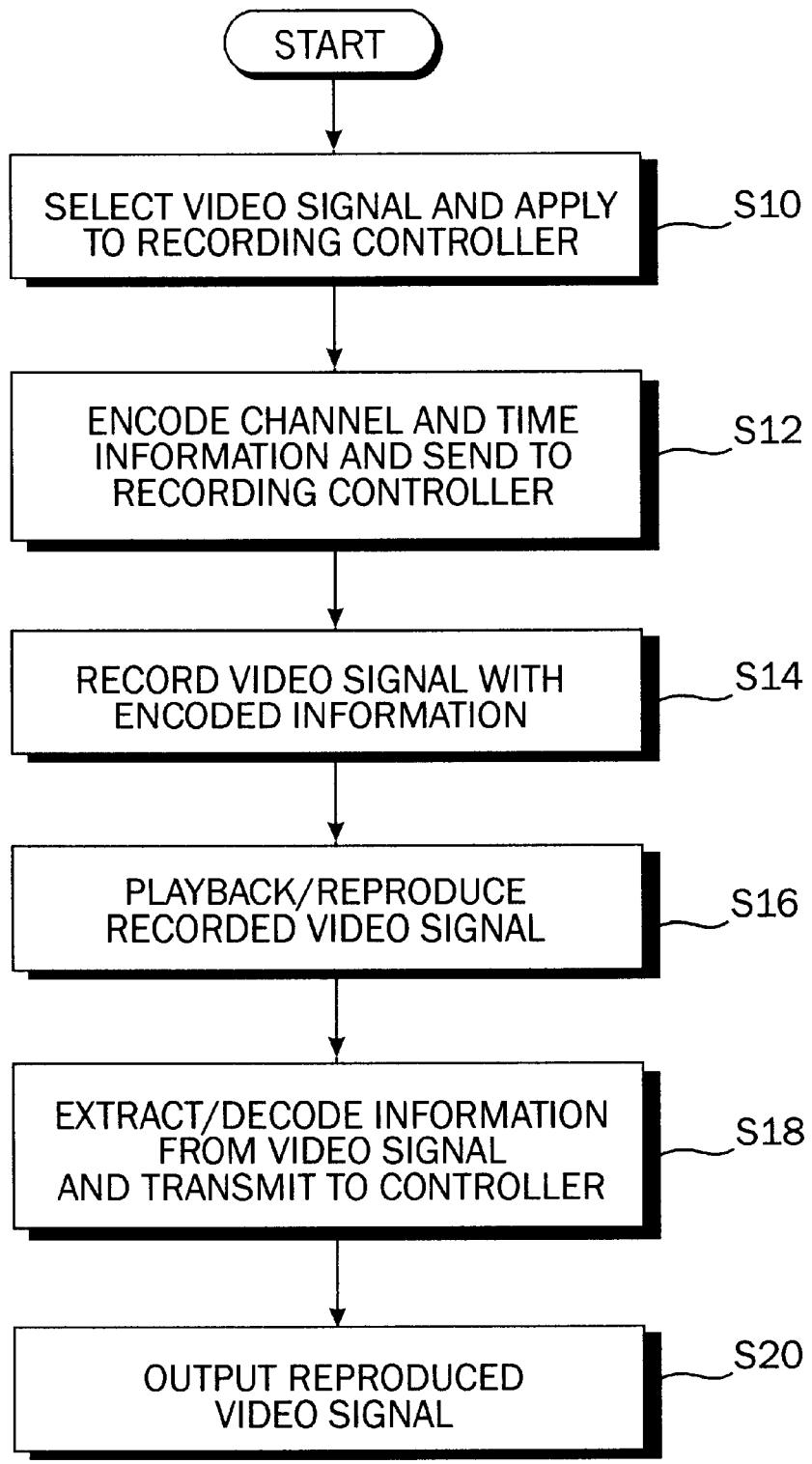
FIG. 3 is a flow chart of the high-speed searching process.
Figure 4:
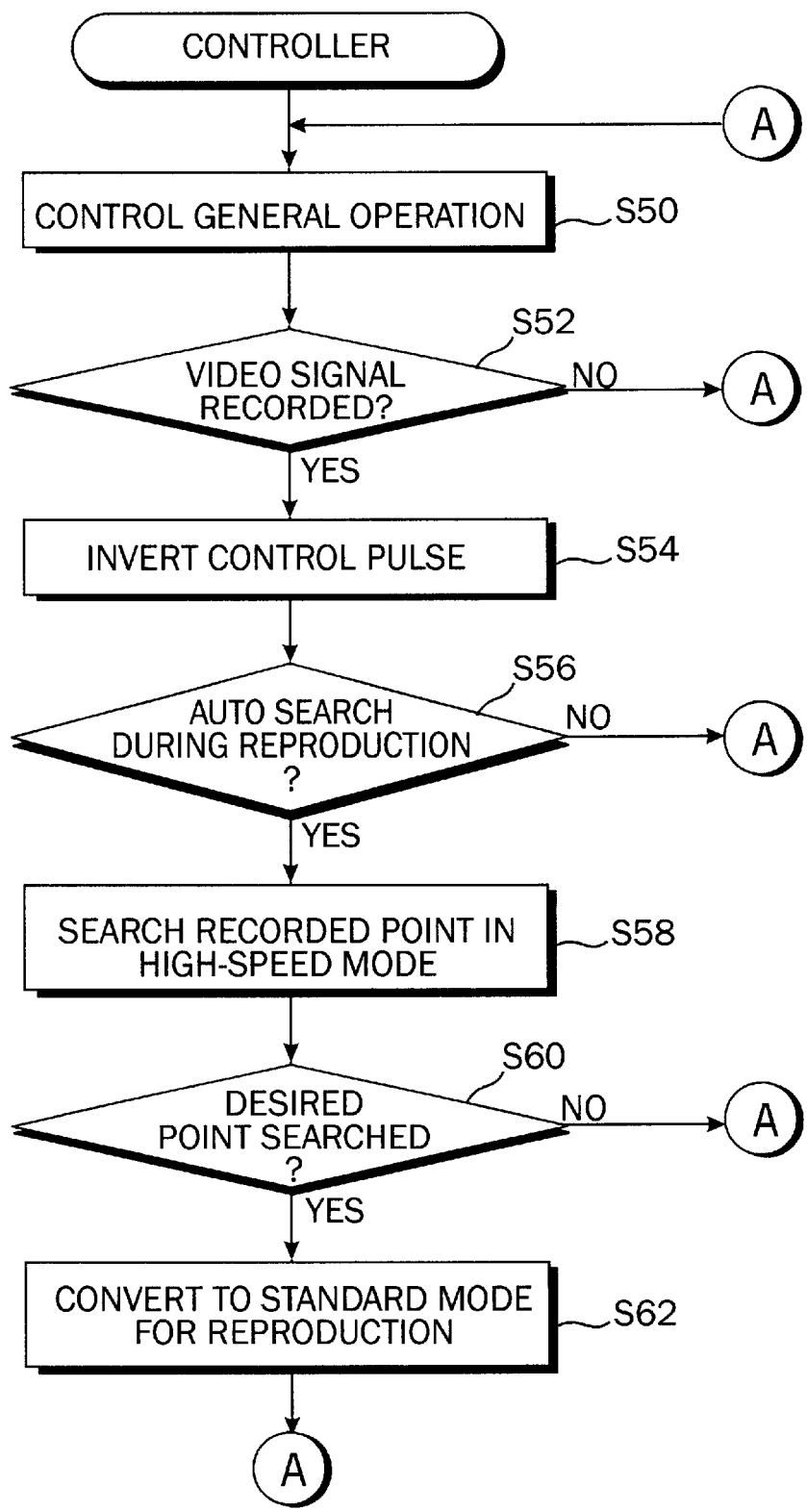
FIG. 4 is a flow chart showing the operation of searching locating and controlling the modes (high-speed and standard) of the VCR.

FIG. 1 is a block diagram of a VCR for performing a high-speed searching operation according to the present invention, FIG. 2 is a diagram showing data included in one H-line applied to the present invention, FIG. 3 is a flow chart of the high-speed searching process, and FIG. 4 is a flow-chart showing the operation of searching, locating and controlling the modes (high-speed and standard) of the VCR. Referring to FIGS. 1, 2, 3 and 4, the VCR for performing the high-speed searching operation according to the present invention includes: a video signal input 10 which applies the video signal of a channel, selected by a controller 70 from video signals of a multi-channel input from a plurality of monitoring cameras (not shown), to a recording controller 30 (step S10); an encoder 20 which encodes channel information and time information transmitted from controller 70 in the interval from 11 H to 18 H selected from the vertical blanking interval of the video signal, as shown in FIG. 2, adds the coded information to the video signal outputted from video signal input 10, and sends it to recording controller 30 (step S12); recording controller 30 for controlling recording of the video signal composed by encoder 20; a magnetic tape 40 which records the video signal sent from video signal input 10 by means of recording controller 30 (step S14); a playback or reproduction controller 50 which plays back or reproduces the video signal recorded on magnetic tape 40 for viewing (step S16); a decoder 60 which extracts and decodes the information inserted by encoder 20 from the video signals sent from playback controller 50, as recorded on magnetic tape 40 and then reproduced, and which transmits the information to controller 70 (step S18); video signal output 80 which outputs the video signal reproduced by playback controller 50 (step S20); and controller 70 for controlling the entire system and performing the high-speed searching process of the invention using a monitor (not shown).

The operation of the VCR performing the high-speed searching process according to a preferred embodiment of the present invention is explained below.

First of all, when a video signal inputted through video signal input 10 is recorded (step S52), controller 70 inverts a control pulse (step S54) at regular intervals, for example, at intervals of ten minutes (the interval can be changed in accordance with the system situation), and records the point in time within the ten minutes without regard to the physical distance on magnetic tape 40, thereby enabling high-speed searching of a specific point in time within the ten minutes while the video signal is reproduced. The point in time at which the control pulse is inverted is called VISS point. The time mode of the time-lapse VCR can be changed during the recording process. Thus, the physical distance on the tape corresponding to a time interval may be varied. Meanwhile, preparing for a case in which the recording interval does not correspond to ten minutes (VISS interval), for example, a case in which recording is stopped and then started again, the VISS point is recorded twice in succession at the point in time when recording is newly started.

When the video signal transmitted through video signal input 10 is recorded on magnetic tape 40, information about the time and channel of the coded image is recorded in each vertical blanking interval, for each video signal, as shown in FIG. 2. Table 1 shows information included in the interval of 11 H to 18 H within the vertical blanking interval. Referring to Table 1, the interval of 11 H to 16 H stores time information, such as year, month, date, hour, minute and second, during which the video signal is recorded; 17 H stores the channel of the video signal recorded; and 18 H stores information which indicates whether recording of the video signal is stopped and then started again.

TABLE 1

| Horizontal line | Information to be recorded |
|---|---|
| 11 H | Year when video signal is recorded |
| 12 H | Month when video signal is recorded |
| 13 H | Date when video signal is recorded |
| 14 H | Hour when video signal is recorded |
| 15 H | Minute when video signal is recorded |

TABLE 1-continued

| Horizontal line | Information to be recorded |
|---|---|
| 16 H | Second when video signal is recorded |
| 17 H | Channel of video signal recorded |
| 18 H | Is recording of video signal stopped and then started again? Yes:0xFF No:0x00 |

When the recorded video signal is reproduced through the aforementioned process, the VISS point which appears first is searched in high-speed mode when automatic search starts during playback so as to decode the information on date and time corresponding to the VISS point, storing it in controller 70 (steps S56 and S58).

Since the current VISS point is recorded in intervals of ten minutes, the location of the ten-minute interval can be calculated by counting the VISS point while high-speed playback is performed.

When a point at which recording is stopped and then started again (a point at which the VISS point is recorded twice in succession) is found, corresponding time information is updated in controller 70, thereby correcting the point in time. For example, when the starting point in time is 0/0/0 (hour/minute/second) on the first of January in 1998 and information for 00/43/40 (hour/minute/ second) on the first of January in 1998 is to be searched, the VISS point is counted with the VCR's high-speed playback function so as to convert the mode of the VCR into a standard playback mode when four VISS points pass (steps S60 and S62), thereby decoding the information included in the vertical blanking interval. By doing so, a desired point in time can be searched.

As described above, with a VCR which can perform the high-speed searching process of the present invention, important information, such as desired time or alarm data, is automatically searched with high speed when a user wants to search an image at a certain desired point in time among images recorded by a time-lapse VCR, thereby improving the user's monitoring efficiency.

It will be apparent to those skilled in the art that various modifications and variations can be made in the VCR performing the high-speed searching process of the present invention without departing from the spirit or scope of the invention. Thus, it is intended that the present invention encompass modifications and variations of the invention provided that they come within the scope of the appended claims and their equivalents.

What is claimed is:

1. A video cassette recorder (VCR) for performing high-speed searching of important information, such as desired time and alarm data, comprising:

an encoder for encoding channel information and time information relating to a video signal to compose a signal, and for adding the encoded information to a vertical blanking interval of the video signal;

a recording/reproducing section for performing at least one of recording the signal composed by the encoder and reproducing a recorded video signal;

a decoder for extracting the channel information and the time information encoded by the encoder from video signals outputted from the recording/reproducing section, and for decoding the extracted information;

a controller for inverting a control pulse at predetermined time intervals when a video signal is recorded so as to record a point in time within the predetermined time intervals, for searching the recorded point in time within the predetermined time intervals in a high-speed mode based on the channel information and the time information extracted and decoded by the decoder when automatic searching is performed during reproduction, for converting a mode of the VCR into a standard mode, starting from the searched point in time, when a desired point in time has been searched, to allow the video signal to be reproduced in the standard mode, and for controlling operations of the VCR; and a video signal output for externally outputting a video signal from the recording/reproducing section.

2. The VCR as claimed in claim 1, further comprising a video signal input for receiving and multiplexing plural input video signals so as to output the video signal to the encoder.

3. A video cassette recorder (VCR) for performing high-speed searching of important information, such as desired time and alarm data, comprising:

encoder means for encoding channel information and time information relating to a video signal to compose a signal, and for adding the encoded information to a vertical blanking interval of the video signal;

recording/reproducing means for performing at least one of recording the signal composed by the encoder means and reproducing a recorded video signal;

decoder means for extracting the channel information and the time information encoded by the encoder means from video signals outputted from the recording/reproducing means, and for decoding the extracted information;

controller means for inverting a control pulse at predetermined time intervals when a video signal is recorded so as to record a point in time within the predetermined time intervals, for searching the recorded point in time within the predetermined time intervals in a high-speed mode based on the channel information and the time information extracted and decoded by the decoder means when automatic searching is performed during reproduction, for converting a mode of the VCR into a standard mode, starting from the searched point in time, when a desired point in time has been searched, to allow the video signal to be reproduced in the standard mode, and for controlling operations of the VCR; and video signal output means for externally outputting a video signal from the recording/reproducing means.

4. The VCR as claimed in claim 3, further comprising video signal input means for receiving and multiplexing plural input video signals so as to output the video signal to said encoder means.

5. A method for high-speed searching of important information, such as desired time and alarm data, comprising the steps of:

encoding channel information and time information relating to a video signal to compose a signal, and adding the encoded information to a vertical blanking interval of the video signal;

performing at least one of recording the signal composed by the encoder and reproducing a recorded video signal;

extracting the channel information and the time information from video signals produced by the performing step and decoding the extracted information;

inverting a control pulse at predetermined time intervals when a video signal is recorded so as to record a point in time within the predetermined time intervals;

searching the recorded point in time within the predetermined time intervals in a high-speed mode based on the channel information and the extracted and decoded time information when automatic searching is performed during reproduction;

converting to a standard mode, starting from the searched point in time, when a desired point in time has been searched, to allow the video signal to be reproduced in the standard mode; and externally outputting a video signal from the performing step.

6. The method as claimed in claim 5, further comprising the step of receiving and multiplexing plural input video signals so as to output the video signal used in the encoding step.

* * * * *